No. 120,871

UNITED STATES PATENT OFFICE.

LEVEN S. GOODRICH, OF WAVERLY, TENNESSEE.

IMPROVEMENT IN THE MANUFACTURE OF IRON.

Specification forming part of Letters Patent No. 120,871, dated November 14, 1871.

*To all whom it may concern:*

Be it known that I, LEVEN S. GOODRICH, of Waverly, in the county of Humphreys and State of Tennessee, have invented a new and useful Improvement in the Manufacture of Iron; and I do hereby declare that the following is a full, clear, and exact description thereof, which will enable others skilled in the art to make and use the same.

This invention relates to a new and important improvement in the process of puddling and boiling and smelting iron ores, and melting iron, especially adapted to the manufacture of wrought-iron from the ore in the processes of puddling and boiling; and it consists in the use of agglomerate balls or masses, composed of the ingredients hereinafter described, and used in combination with the iron or iron ore; the temperature of the furnace and the circulation of the blast being, in a great measure, controlled by the size and quantity of the agglomerate balls; and the effect produced upon the ores and iron treated being, in a great measure, dependent upon the proportions of the ingredients of which the balls or masses are formed.

The chemical character of the different iron ores varies so much that the true proportions of the ingredients of which my agglomerate balls are formed can be ascertained only by experiment. This the metallurgist can readily ascertain in working the ore or smelting and melting iron. Different ores melt at different degrees of heat and require different quantities and kinds of flux. The flux being one of the ingredients of the agglomerate balls, the quantity and kind of flux must be varied to properly flux each particular kind of ore.

In carrying out my invention I combine and form into artificial stone or hard balls or masses, of any desired form and size, iron ore reduced to a granulated state or to a sufficient degree of fineness, pulverized coal or carbon, and lime or other flux. Gum or gluten of any kind may be added to produce sufficient cohesion in the mass. The entire quantity of ore used in the furnace may (in combination with carbon and the proper flux) be formed into these balls or masses; or the balls thus formed may be used in combination with ores in puddling, melting, or smelting.

I do not, therefore, confine myself to any particular proportions of the ingredients, nor to any particular manner of using the balls or masses so formed. Experience has taught me that, by thus combining with the ore carbon and the proper kind and quantity of flux in the deoxidizing and carbonizing of ores, I overcome obstacles which have hitherto been considered insuperable.

The balls are composed of seventy-five parts of iron ore; twenty parts carbon; three parts slaked lime; one part nitrate soda; and one part molasses. The ore, carbon, and lime are mixed intimately together, and the molasses and nitrate of soda dissolved in water enough to form the whole into a mass, which is then formed into balls and dried in the sun. This is about an average proportion, which, as before said, varies. My object is to avoid the melting point in carbonizing, while I go as near it as I can. I thus charge the ore as highly with carbon as possible before it reaches the melting point. I would say, for puddling use eighty parts burnt-iron ore made very fine; sixteen parts carbon; two parts slaked lime; one-fourth part nitrate soda; one and three-fourths part of molasses; and mix the ore, carbon, and lime minutely, and dissolve the molasses and nitrate soda in water enough to mix, and then form into balls and dry them. For melting iron ore I use seventy parts ground carbon; three-fourths part lime; one-fourth part nitrate of soda; twenty-eight parts finely-ground ore; and one part molasses. For smelting iron ore, sixty-eight parts ground and burnt-iron ore; twenty-five parts carbon; five parts lime; one part nitrate soda; and one part molasses.

Having thus described my invention, I claim as new and desire to secure by Letters Patent—

The process above described of forming artificial balls of ground carbon, lime, nitrate of soda, iron ore, and molasses, as and for the purpose specified.

LEVEN S. GOODRICH.

Witnesses:
S. W. HENDERSON,
J. H. ANDERSON.

(85)